United States Patent [19]

Wirth

[11] Patent Number: 4,844,192

[45] Date of Patent: Jul. 4, 1989

[54] SCALE

[75] Inventor: Johannes Wirth, Zurich, Switzerland

[73] Assignee: Wirth Gallo Messtechnik AG, Zurich, Switzerland

[21] Appl. No.: 129,192

[22] Filed: Dec. 7, 1987

[30] Foreign Application Priority Data

Dec. 16, 1986 [CH] Switzerland ............... 05002/86

[51] Int. Cl.$^4$ ................ G01G 3/00; G01G 1/18
[52] U.S. Cl. ................... 177/225; 177/246; 177/DIG. 9
[58] Field of Search .................. 177/246, DIG. 9, 225

[56] References Cited

U.S. PATENT DOCUMENTS 3,148,742  9/1964  Giulie ........................ 177/246 X
4,274,501  6/1981  Gallo et al. .................. 177/225 X

FOREIGN PATENT DOCUMENTS 195876  1/1986  European Pat. Off. ........... 177/246

Primary Examiner—George H. Miller, Jr.
Attorney, Agent, or Firm—Stanley R. Moore; Thomas L. Crisman

[57] ABSTRACT

This inventive scale consists of a frame (2), a platform (3) parallel and perpendicular to the frame (2), a load lifter (5) and a level mechanism consisting of at least one arm (1). The lever mechanism transmits the load from the platform (3) to the load lifter (5) and is connected to the frame (2), the platform (3) and the load lifter (5) by means of couplings (10, 13, and 15). The lever mechanism, consisting of at least one arm (1), has a flexible connector at each end and one in the middle (7, 8, and 9). The end connectors (7 and 9) are attached to the platform (3) and the load lifter (5) by means of pins (10 and 15), respectively. The middle connector (8) is attached to the frame (2) by means of two swivel couplings (13).

7 Claims, 1 Drawing Sheet

SCALE

BACKGROUND OF THE INVENTION

1. Field of the Invention

The present invention pertains to scales and, more particularly, to a scale having a lever mechanism connected to the scale frame through flexible connectors.

2. History of the Prior Art

The prior art is replete with scale designs. Such scales are described, for example, in U.S. Pat. No. 4,171,026. They are known as rigid scales, i.e., a scale in which the moving parts merely make virtual movements. A dynamometer cell with oscillating strings is usually used as the load lifter, which sends an output signal to some sort of indicator or display device. In principle, it is assumed that all components of such scales, i.e., the frame, platform, arm and lifter, are of rigid design to prevent any bending under the load. Taking rigid design requirements into account, the components are always made heavy and strong enough [to withstand anticipated loads]. Undesirable elasticity that may occur in the couplings as the arm is bent is thereby eliminated.

The heavy design of such components has the disadvantage of making the scale excessively tall, in addition to increasing costs. Since there is an increasing demand for smaller scales, the arms cannot always be made strong enough to rule out any possibility of bending, since they must be as flat as possible. In known scales, this is allowed for by designing couplings that bend accordingly. But this entails the disadvantage of less strength while very little height is saved and it is considerably more expensive to manufacture such couplings than to use conventional couplings such as swivel joints and pins.

It would be an advantage, therefore, to overcome the disadvantages of the prior art by providing an improved scale that, on one hand, can be built in a low design, but which, on the other hand, eliminates elasticity in the couplings caused by any bending of the arm without requiring any specially designed couplings. The present invention provides such a scale and the advantages thereof.

SUMMARY OF THE INVENTION

The present invention relates to scales and improvements therein. More particularly, one aspect of the invention comprises a scale with a stand or frame, a platform parallel and perpendicular to the frame, and a load lifter and a lever mechanism consisting of at least one arm that transmits the load from the platform to the load lifter. The lever mechanism is connected to the frame, the platform and the lifter by means of couplings. In this manner a scale is provided in a low design eliminating elasticity in the couplings caused by any bending of the arm.

In yet another embodiment, the invention described above further includes a scale characterized by an arm held in place by a connector at each end and an intermediate third connector in such a way that the two end connectors are attached to the platform and the load lifter by means of pins. The middle connector is attached to the frame by means of two swivel couplings. The scale may also be characterized by an arm and connectors made out of a single piece. It may thus be seen that the present invention includes a scale having a lever mechanism with at least one arm attached to the couplings by means of flexible connectors.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Figure 1:
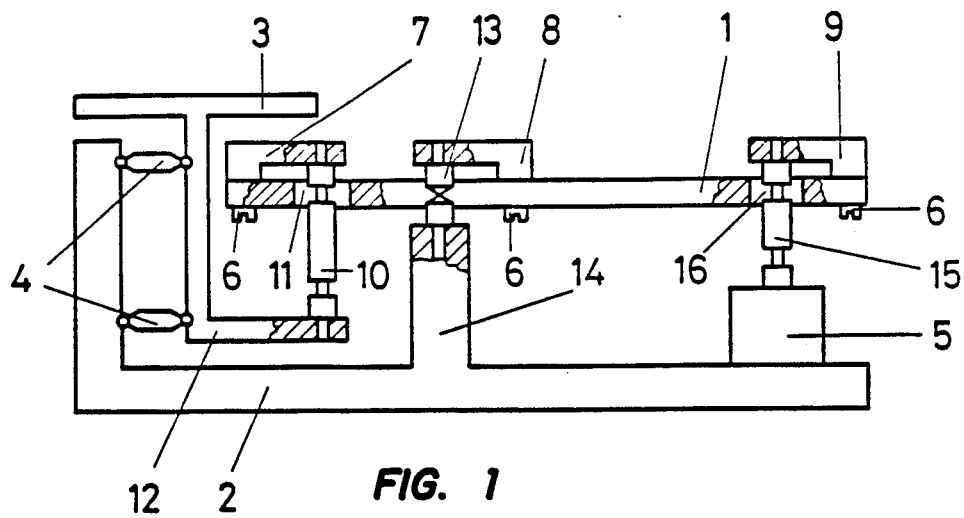
FIG. 1 is a front elevational view of one embodiment of the scale constructed in accordance with the principles of the present invention and with sections thereof cut away for illustrating the construction thereof.

Referring first to FIG. 1 there is shown a sample design of the present invention in which the lever mechanism, for the sake of simplicity, consists of a single arm (1). The scale has a frame (2), to which a platform (3) is connected by means of parallel perpendicular couplings (4) in the usual manner. A load-reading device or load sensor (5), such as a conventional dynamometer with oscillating strings, is also attached to the frame (2).

The arm (1) has three connectors (7, 8 and 9), which are fastened in place with screws (6). The first connector (7) is attached to the left end of the arm (1), as shown in the drawing. Like the other two connectors (8 and 9), it consists of an L-shaped flexible link. A pin (10) extends through a hole (11) in the arm (1) and fits into the connector (7) on one end and the weight output end (12) of the lifter (3) on the other.

Figure 2:
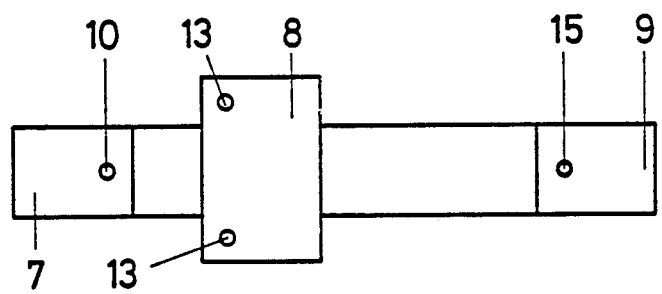
FIG. 2 comprises a basic view of the load transmitting arm of FIG. 1.

The second connector (8) extends outward from both sides of the arm (1) (FIG. 2). One end of the two swivel couplings (13) fits into a support (14) on the frame (2) and the other end fits into this connector (8). The axes of the swivel couplings (13) lie vertically in a vertical plane that is perpendicular to the plane of the axis of the arm. The swivel couplings (13) form a bearing around which the arm (1) is free to pivot.

The third connector (9) is attached to the right end of the arm (1). One end of a pin (15) passing through a hole (16) in the arm (1) fits into this connector (9) and the other end fits into the weight input end of the sensor (5)

Figure 3:
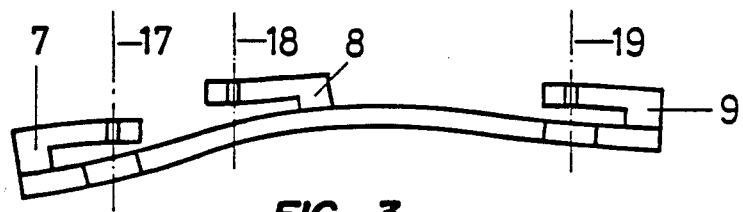
FIG. 3 is a front elevational view of the load transmitting arm of FIG. 1 under a load.

When a load is applied to the platform (3), the arm (1) acts like a flexible spring. It bends slightly (see FIG. 3) and, due to the inherent longitudinal elasticity of the sensor (5), swings slightly counterclockwise. Between the pins (10 and 15), the arm (1) arches upward, while the end parts between the pins (10 and 15) and their ends bend downward. Two of the connectors (7 and 9) bend in the same direction as the arm (1), but the other connector (8) bends in the opposite direction. Thus the axes (17, 18, and 19) of the pins (10 and 15) as well as the axis of the swivel couplings (13) connecting the arm (1) to the frame (2), the platform (3) and the sensor (5), remain vertical. These couplings therefore are not deformed and thus there is no significant springing action back to their original shape that would give a false weighing reading, even though they are rigid and designed to be relatively less flexible.

In manufacturing the scale, a specialist takes the elasticity of the arm (1) and the sensor (5) into account in order to obtain accurate weights. If the lever mechanism consists of more than one arm, obviously, the necessary connectors and swivel couplings would have to be designed to connect one arm behind the other. The swivel bearing for all the arms would have to be designed similarly to the one used for the arm in the sample designs illustrated in FIGS. 1-3.

Figure 4:
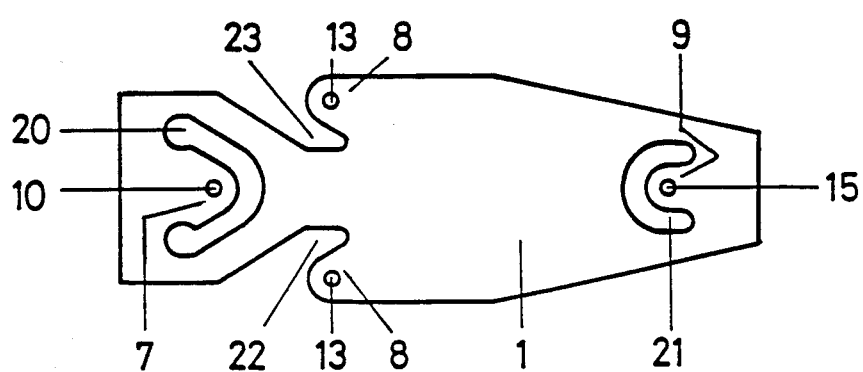
FIG. 4 is an alternative embodiment of the load transmitting arm of FIGS. 2 and 3 illustrating a single piece design.

FIG. 4 shows a variant of an arm design in which the arm (1) itself and the connectors are made out of single piece. This design has obvious economic advantages, since it is a simple but very accurate way to design the arm (1). The required elasicity of the connectors (7, 8, and 9) is obtained by cutting out appropriately shaped slots (20 and 21) and notches (22 and 23).

Having described the invention in connection with certain specific embodiments thereof, it is to be understood that further modifications may now suggest themselves to those skilled in the art and it is intended to cover such modifications as fall within the scope of the appended claims.

I claim:

1. A scale comprising
   a frame (2);
   a platform (3) mounted parallel and perpendicular to the
   frame (2);
   a load sensor (5);
   a lever mechanism having at least one flexible arm (1) which bends and transmits the force of the weight from the platform (3) to the load sensor (5);
   couplings (10, 13 and 15) connecting the lever mechanism to the frame (2), the platform (3) and the load sensor (5); and
   flexible connectors (7, 8, 9) attaching the flexible arm (1) to the couplings (10, 13, and 15) for permitting the flexible arm to bend in response to weight from the platform (3).

2. The scale as described in claim 1, further characterized by a flexible arm (1) held in place by a flexible connector (7 and 9) at each end and an intermediate third flexible connector (8) in such a way that the two end connectors (7 and 9) are attached to the platform (3) and the load sensor (5) by means of pins (10 and 15), respectively, and the middle connector (8) is attached to the frame (2) by means of two swivel couplings (13).

3. The scale as described in claim 1, further characterized by a flexible arm (1) and flexible connectors (7, 8, and 9) made out of a single piece.

4. The scale as described in claim 3, further characterized by the connectors (7 and 9) being integrally formed with the flexible arm (1) through slotted sections (20 and 21) for providing the required elasticity in the connectors (7 and 9).

5. The scale as described in claim 1, further characterized by the flexible connectors (7, 8, 9) being constructed of an L-shaped flexible link.

6. The scale as described in claim 5, further characterized by the L-shaped flexible link of flexible connectors (7, 8, 9) being secured to the arm (1) by screws (6).

7. The scale as described in claim 6, further characterized by the flexible connector (7) being secured to a first end of the arm (1) and coupled to the platform (3) and flexible connector (9) being secured to the opposite end of the arm (1), and coupled to the load sensor (5).

* * * * *